United States Patent [19]
Wales

[11] Patent Number: 5,589,663
[45] Date of Patent: Dec. 31, 1996

[54] EARTHED CABLE GLAND

[75] Inventor: Alan C. D. Wales, Newcastle upon Tyne, United Kingdom

[73] Assignee: Elkay Electrical Manufacturing Company Limited, Newtown, United Kingdom

[21] Appl. No.: 171,651

[22] Filed: Dec. 22, 1993

[30] Foreign Application Priority Data

Dec. 23, 1992 [GB] United Kingdom .................. 9226789

[51] Int. Cl.⁶ .................................................. H02G 15/04
[52] U.S. Cl. ........................ 174/51; 174/65 SS; 174/78
[58] Field of Search ........................... 174/65 SS, 65 G, 174/65 R, 51, 78, 75 C, 88 C

[56] References Cited

U.S. PATENT DOCUMENTS

| | | | |
|---|---|---|---|
| 2,816,949 | 12/1957 | Curtiss | 174/51 |
| 3,465,092 | 9/1969 | Schwartz | 174/78 |
| 3,782,842 | 1/1974 | Benker | 174/65 SS X |
| 4,224,464 | 9/1980 | Bunnell et al. | 174/65 R |
| 4,629,825 | 12/1986 | Lackinger | 174/65 SS |

FOREIGN PATENT DOCUMENTS 1228743  4/1971  United Kingdom .
1505639  3/1978  United Kingdom .

*Primary Examiner*—Kristine L. Kincaid
*Assistant Examiner*—Paramita Ghosh
*Attorney, Agent, or Firm*—Darby & Darby, P.C.

[57] ABSTRACT

An earthed cable gland for an armoured cable for mounting on an enclosure wall includes an electrically insulating gland nut and an electrically insulating tubular entry member. The entry member is threaded at one end for engagement with the gland nut. At least one slot extends longitudinally from an other end of the entry member along a part of its length. A device is included for mounting the entry member on an enclosure wall. An armoured cable extends through the cable gland and has an armoured covering. An electrically conducting tubular connection member is retained within the entry member for engagement with the armour of the cable. An electrically conducting contact member is located within the at least one slot in the entry member. The contact member is moveable on mounting of the entry member on the enclosure wall, between a first position free of the connection member and a second position in abutment and electrical contact with the connection member. An earthed tag is electrically connected to the contact member.

9 Claims, 7 Drawing Sheets

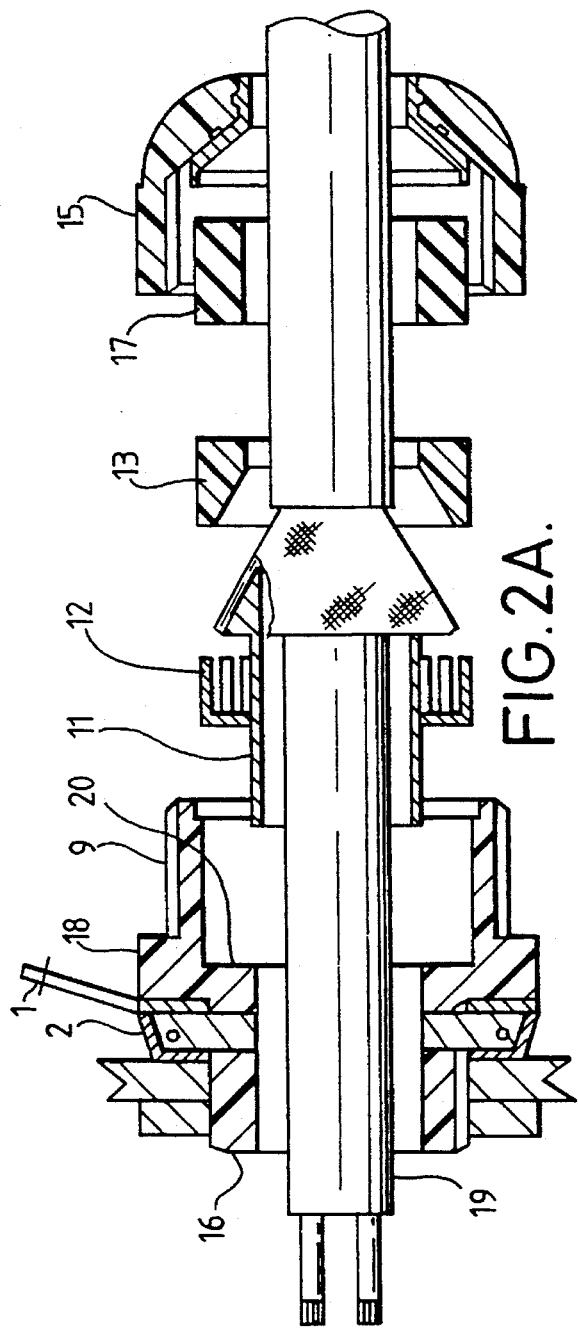
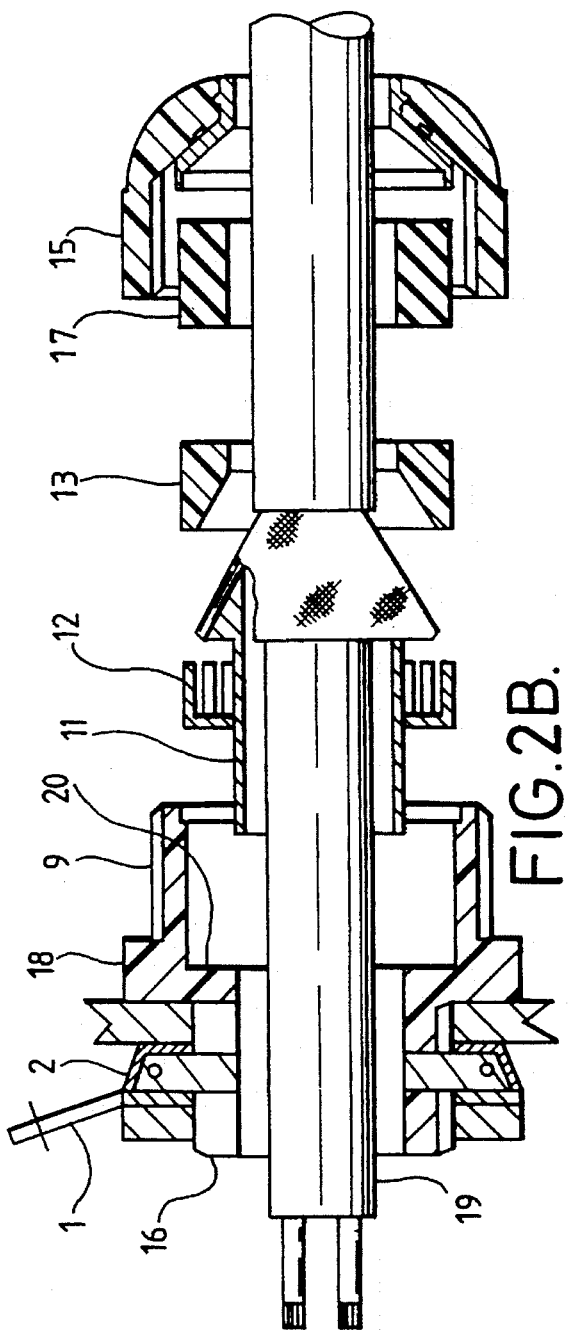

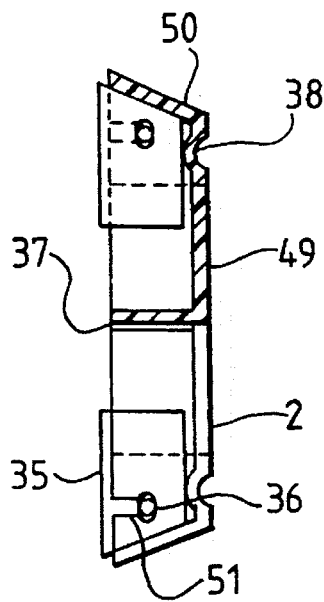
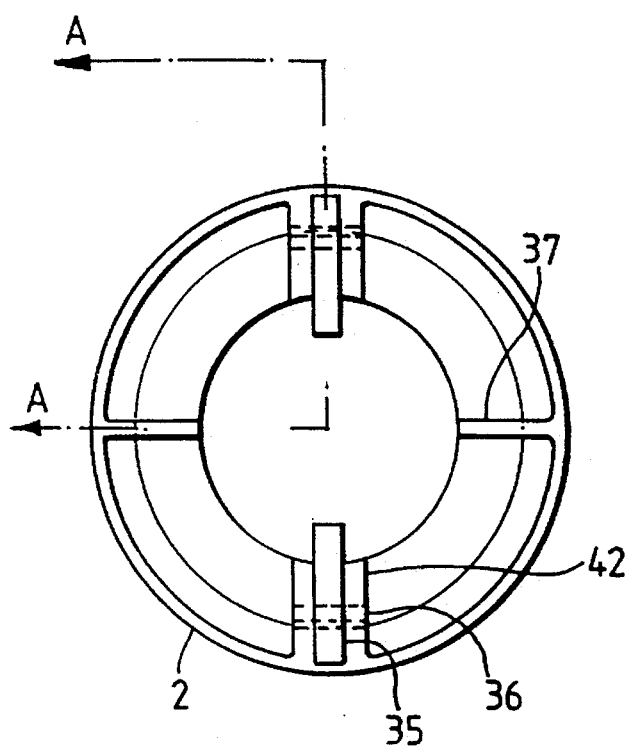
FIG.7B.   FIG.7A.
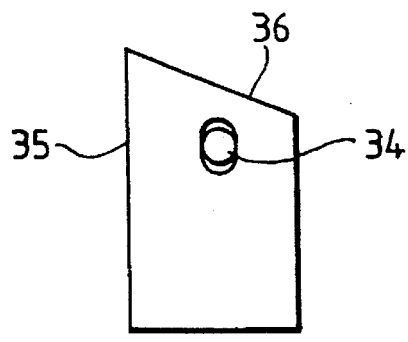
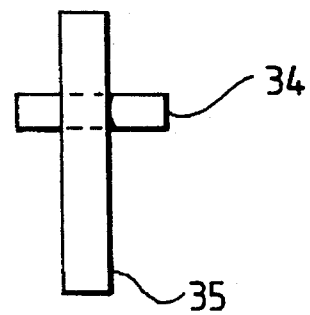
FIG.7C.   FIG.7D.

EARTHED CABLE GLAND

FIELD OF THE INVENTION

The invention relates to an earthed cable gland for an armoured cable for mounting on an enclosure wall.

An armoured cable contains one or more central cores, for example three cores in a normal 3-phase supply system. Each core is shielded by insulation, and around the cores is the armour, a conducting member. When the cable passes through an enclosure wall, it will be mounted on the wall by means of a cable gland. For the armoured cable to be mounted safely and effectively, this cable gland should provide a good connection between earth and the cable armour. This is to prevent an insulation failure between the conductor and the cable armour from being dangerous. If the connection between the cable armour and earth is good, then any fault currents have a good path to earth.

BACKGROUND OF THE INVENTION

Conventionally, such cable glands for armoured cables have been made from metal. The metal used is a good conductor. An example of a typical metallic gland design can be seen in cross-section in FIG. 1. The cable armour 120, which is typically a braid of metal wires, is revealed by stripping away the outer insulation of the cable and is forced against a metallic cone element 111. This in turn abuts the entry component 102 mounted on the enclosure, which is itself also metallic and conducting. This again abuts a metallic earth tag 101 which provides the connection to an external earth. An additional metal plate (not shown) may be needed at the interior edge of the enclosure wall if the wall is of plastics material. This is to ensure sufficient contact over variety of temperature ranges.

British patent 1228743 discloses an electrical connector including a cylindrical body of electrically insulating material. Any build-up of electrical charge on an outer component is prevented by means of a path to earth through a copper spring, a steel nut and washer, and the metal enclosure wall.

British patent 1505639 describes a cable gland for a sheathed cable which comprises a metal body and an insulator assembly. The insulator assembly includes a metal inner member and an insulating outer member. An earthed tag can be connected to the inner member, and an earthed stud can be tapped to the metal body.

SUMMARY OF THE INVENTION

Cable gland design has to meet national and international standards which constrain the choice of a number of parameters. Thus it is necessary for cable glands to meet torque and seal grip performance standards, as well as to provide the necessary earthing performance. Hitherto, this has limited the choice of materials used in construction of cable glands to metal.

For economy, and to reduce component weight, it is desirable to make cable glands from plastics material. This is also desirable for prevention of corrosion. Corrosion of metallic cable glands, which is especially relevant to outdoor use, is a serious problem for which no satisfactory solution has been found. Safety demands regular inspection of such glands in maintenance procedure. Metallic materials for such cable glands would desirably be used only to provide the conducting connection to earth. Until now, the problem of achieving the necessary structural strength with the required gland dimensions and also providing a sufficient earth connection from the cable armour to an external earth has prevented plastics materials from being used. The present invention provides a solution to this problem.

Accordingly, the invention provides an earthed cable gland for an armoured cable for mounting on an enclosure wall comprising:

an electrically insulating gland nut;

an electrically insulating tubular entry member, threaded at one end for engagement with the gland nut, and with one or more slots extending longitudinally from the other end of the entry member along a part of its length;

means for mounting the entry member to an enclosure wall;

an electrically conducting tubular connection member retained within the entry member and for engagement with the armour of an armoured cable extending through the cable gland;

an electrically conducting contact member located within the or each slot in the entry member, the or each contact member being moveable, on mounting of the entry member to the enclosure wall, between a first position substantially free of the connection member and a second position in abutment and electrical contact with the connection member; and an earth tag for electrical contact with the or each contact member.

Preferably the or each electrically conducting contact member is mounted for sliding contact with a gland surface in use situated at an angle to the axis of the armoured cable, the contact member being urged against the gland surface and in a direction away from the armoured cable by the action of a spring into the first position, whereby on tightening of the cable gland the contact member is urged against the action of the spring along the gland surface towards the armoured cable into the second position. Preferably the gland surface is a surface of a washer on which the contact member is retained. It is preferable that the earth tag has an integral finger element which abuts the contact member in use, and which on tightening urges the contact member against the action of the spring.

Preferably, the electrically insulating components in the earthed cable gland are made from plastics material. This achieves the object of making an earthed cable gland from plastics material which can meet the required standards. It also avoids the problem of corrosion in metallic cable glands. Embodiments of the invention provide a protective cover for the internal components against moisture or dust, and also a means of environmental sealing for the earthing washer. The structural strength of the gland is provided essentially by plastics components, the metallic components providing the connection between external earth and the cable armour. Connection by means of one or more contact members abutting an electrically conducting connection member through a slot in the entry member allows the strength of the gland to be maintained, as the slot does not significantly lessen the structural strength of the entry member.

The gland of the inventions can be especially useful in reducing electrical noise interference in instrumentation cables with braided armour. In such applications, because of the need for satisfactory operation even at low signal values, all the metallic earthing components should be silver plated.

In a preferred utilization of the earthed cable gland of the invention, one end of a cable armour braiding is earthed by means of the gland, and the other end of the braiding is insulated from metal parts. To effect this insulation, the other connection to the cable can be made by means of a plastics material cable gland such as that described in British Patent Application No. 2256979-A.

BRIEF DESCRIPTION OF THE DRAWINGS

Specific embodiments of the invention are described below, by way of example, with reference to the accompanying drawings in which:

FIGS. 2A and 2B each show a view of the components of a gland according to embodiments of the invention before tightening of the gland on to the cable.

FIGS. 7A, 7B, 7C and 7D show an earthing washer according to a further embodiment of the invention.

DETAILED DESCRIPTION OF THE DRAWINGS

Figure 3A:
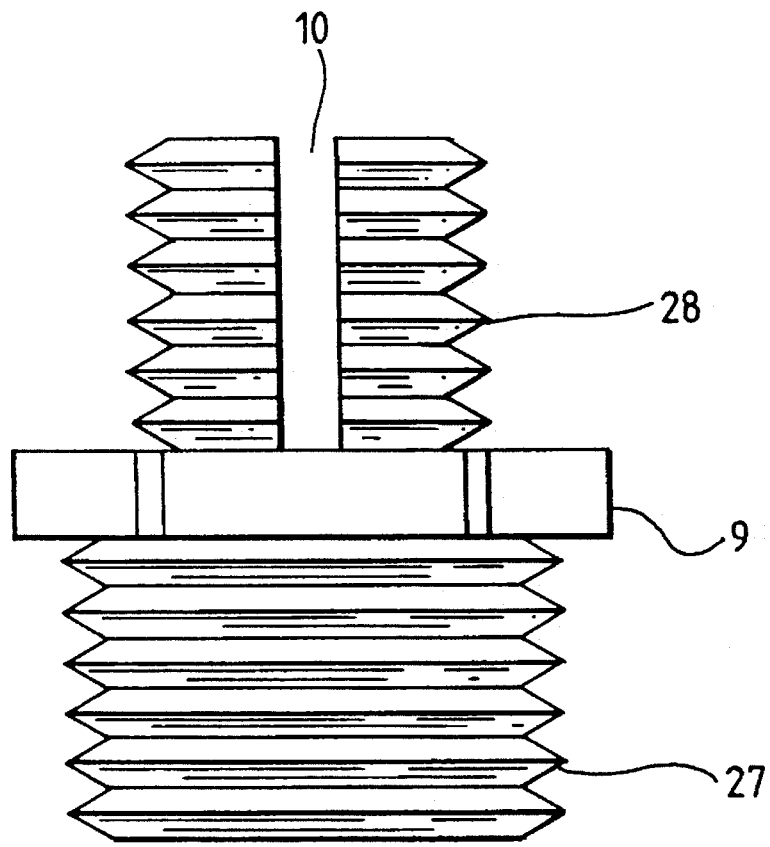
FIGS. 3A and 3B show the threaded entry component of specific embodiments of the invention in two different orientations.
Figure 3B:
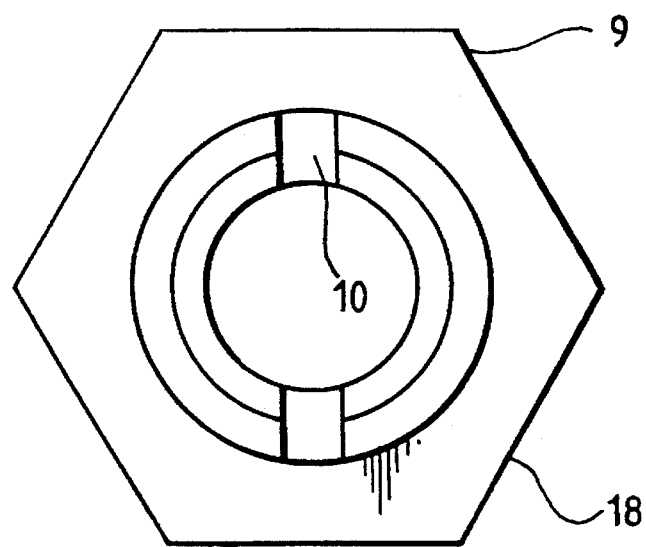

The components of the earthed cable gland can be seen in FIG. 2A. The earthed cable gland is principally made of plastics material, the only metallic parts being those which provide the earthing connection between the cable armour and the earth tag. The armoured cable 19 passes through the gland, which is mounted on the wall of an enclosure. The entry component 9 of the gland, mounted on the enclosure wall by lock nut 16, is made of plastics material. Entry component 9 is shown more clearly in FIGS. 3A and 3B. The entry component 9 has a hollow centre through which the armoured cable is passed. A central region 18 of the entry component defines an external surface which is preferably formed in hexagonal cross-section and is usable for the tightening of either gland nut 15 or lock nut 16 onto the entry component.

To each side of the central region 18 are threaded sections 27, 28 each running from the hexagonal section 18 to one end of the entry component 9. One of these threads 28 is adapted to mate with lock nut 16, and this threaded section also has one or more longitudinal slots 10 extending through the whole thickness of the entry component. The slots are to accommodate the contact members to be described later. In the embodiment illustrated, the entry component has two such slots. The other threaded section 27 is adapted to mate with the gland nut 15. The hollow centre of component 9 is cylindrical in cross section, with a larger diameter inside threaded section 27 than elsewhere in the component. This increase in diameter occurs at internal face 20.

Prior to assembly of the gland, the outer insulation of the armoured cable will have been stripped away from the enclosure end of the cable, as will the cable armour except for a short exposed length.

A number of components of the cable gland surround the armoured cable and are located in a recess defined by threaded section 27 and internal face 20 of the entry component 9 and also by the gland nut 15. Nearest to the gland nut is a seal 17, preferably of elastomeric material. As well as sealing the gland, this seal holds the components in position on tightening and prevents relative movement between the entry component and the gland nut. Adjacent to the seal is a clamp component 13, preferably of plastics material.

The next component is the electrically conducting tubular connection member, namely a metallic cylinder 11 on which is formed at one end a frusto-conical outer surface tapering radially inwards towards the end of the cylinder. This end is located at the gland nut side. In use, cylinder 11 is slid along the unarmoured length of cable and its tapered end is forced underneath the exposed length of cable armour.

Component 12 is then slid over cylinder 11. Component 12 consists of a ring from which extend longitudinally along the cable a number of flexible finger elements. These finger elements can be manually forced over the cone of cylinder 11 and the length of cable armour lying thereon, and they can thus retain the cable armour against component 11. Preferably, ring 12 is metallic. Additionally, the internal surface of clamp 13 is tapered to match the taper of cylinder 11, so that when gland nut 15 is tightened against entry component 9 the internal face of clamp 13 is forced against the external tapered face of cylinder 11, thereby forcing the exposed length of cable armour into contact with both cylinder 11 and ring 12.

Once gland nut 15 is fully tightened the tubular part of cylinder 11 extends past internal face 20 through the hollow centre of entry component 9. It extends beyond central region 18 of the entry component to threaded section 28, and is thus accessible through slots 10. The connection between external earth and the cable armour is made by means of cylinder 11, contact members 5 (described below) and external earth tag 1. The connection between cylinder 11 and the earth tag 1 is now described.

Figure 5A:
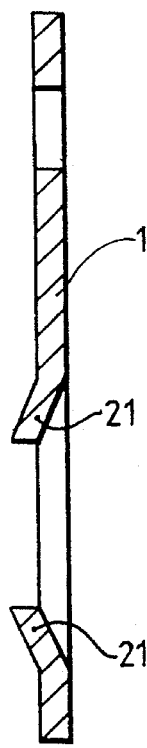
FIGS. 5A and 5B show the earthing tag of specific embodiments of the invention in two different orientations.
Figure 5B:
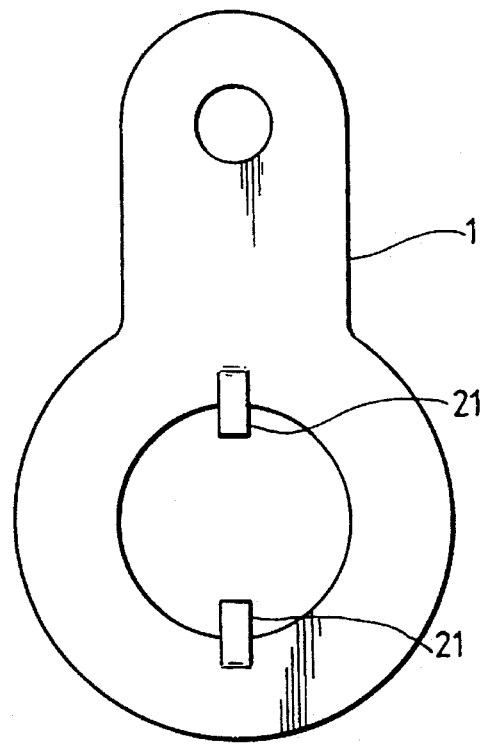

A first embodiment of the external earth connection to the cylinder 11 is illustrated in FIGS. 5 and 6. FIG. 5 shows two views of the earth tag 1; FIG. 5B is a plan view and FIG. 5A is a sectional view. FIGS. 6A to 6G show earthing washer 2, the component which contains the electrically conducting contact members.

Earth tag 1 provides the attachment for the external earth. The tag 1 has resilient fingers 21. The central aperture of tag 1 has a greater diameter than threaded section 28 of the entry component, but the distance between fingers 21 is less that the diameter of threaded section 28. These fingers 21 fit into slots 10. The distance between the fingers 21 is however greater than the outer diameter of cylinder 11.

Earthing washer 2 is located adjacent to the earth tag 1. The earthing washer and earth tag can either be mounted between the entry component 9 and the enclosure wall (FIG. 2A) or between the locknut 16 and the enclosure wall (FIG. 2B), but in each case the relative orientations of the earth tag 1 and the earthing member 2 must be the same. FIG. 6b shows the face of the earthing washer 2 which is in use adjacent to earth tag 1. The washer 2 has a cup shape with a base 29 and an annular side wall 30. The side walls 30 taper outward away from the base.

The base 29 has a central bore which is slightly larger than the outer diameter of threaded section 28 of the entry component 9. A circular spring 4 is mounted on base 29 by means of claws 3. Mounted on the spring 4 are the electrically conducting contact members, here designated 5. To either side of the contact members are guides 22, which prevent lateral movement of the contact members 5 and guide the spring 4 into the shape shown in FIG. 5A. The spring is not fixed to any of claws 3, guides 22 or contact members 5.

Contact members 5 are flat metallic plates, which are preferably rigid members. The sides of each contact member 5 are parallel. The outer edge is matched to the inner surface of side wall part 30 both in curvature and in angle of taper. The inner edge is parallel to the outer face of cylinder 11 and has the same radius of curvature. The plates 5 must be sufficiently thick for the inner edge to provide a sufficient conductive contact to cylinder 11. An increased contact area with cylinder 11 could also be achieved by having a widened or flared inner edge to the contact member. The other two edges are flat, parallel to each other, and normal to the axis of the gland. In the rest position shown in FIGS. 6B and 6C, the contact members 5 are in an equilibrium position. Their separation is less than the external diameter of the threaded section 28. The contact members 5 fit into slots 10 and provide the means of electrical contact to the cylinder 11.

On assembly, earth tag fingers 21 are placed in contact with contact members 5. These components are located in slots 10 and will form the electrical connection between cylinder 11 and the external earth. On tightening of lock nut 16 against entry component 9, the earth tag 1 and its fingers 21 are urged towards earthing washer 2. The contact members 5 are urged by fingers 21 along side walls 30 towards base 29 against the action of spring 4, which deforms out of the shape shown in FIGS. 6a and 6b and 6e. The inner edge of each contact member 5 is thus moved inwards toward cylinder 11, which it eventually abuts. The earth tag fingers 21 are preferably resilient, so that tightening can be used to increase the connection force on contact members 5. On loosening of lock nut 16, spring 4 provides a release force to urge contact members 5 away from base 29.

Figure 6A:
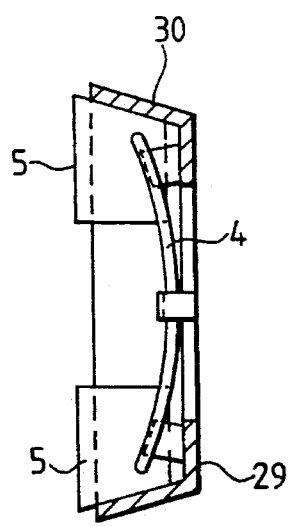
FIGS. 6A, 6B, 6C, 6D, 6E, 6F and 6G show an earthing washer of a specific embodiment of the invention according to two different methods of construction.
Figure 6B:
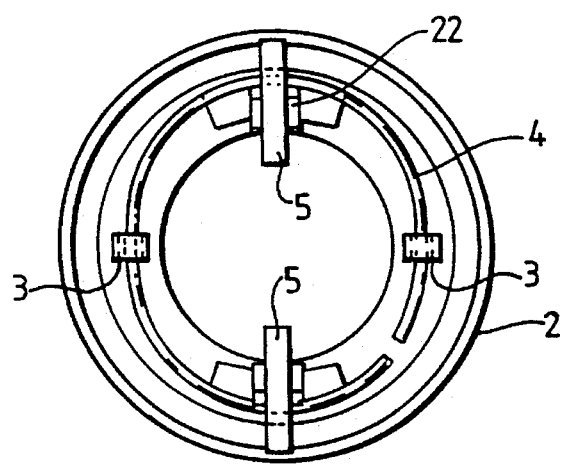
Figure 6C:
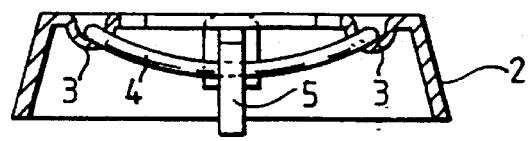

Although in the embodiment of FIGS. 6A, B and C two contact members are shown, there could in fact be only one such contact member or there could be three or more.

Figure 6D:
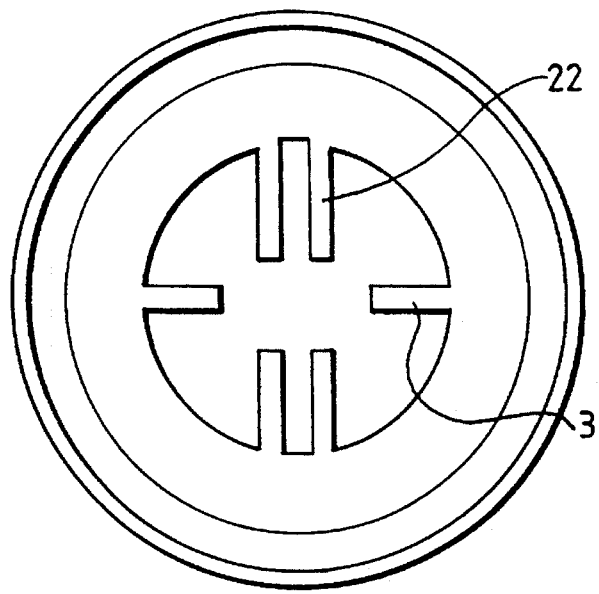
Figure 6E:
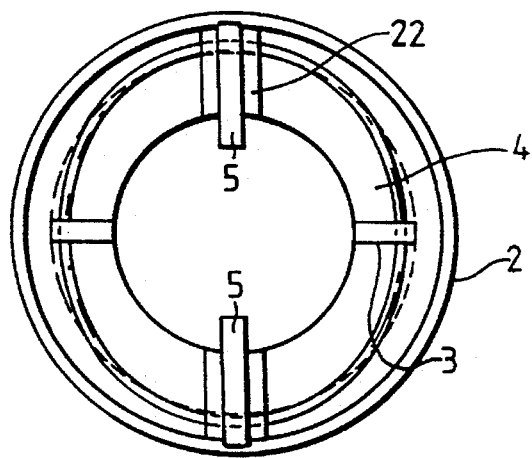
Figure 6G:
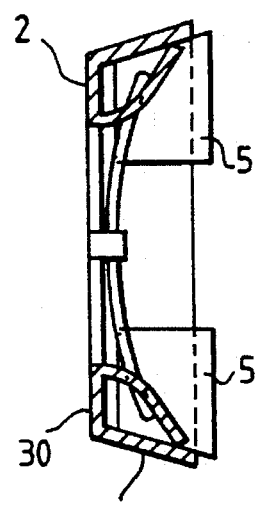
Figure 6F:
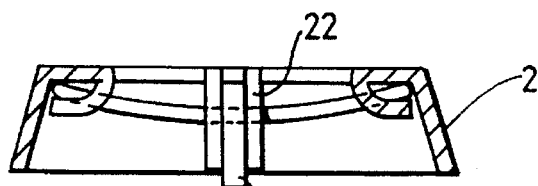

FIGS. 6D, 6E, 6F and 6G show how a guide washer according to a version of the first embodiment can be produced. FIG. 6d shows an initial piece which can be stamped out of a metal plate. Guides 22 and jaws 3 are integral with the main washer body in this version of the first embodiment. The spring 4 with contact members 5 thereon can then be added, with jaws 3 bent around the spring to hold it against base 29. Guides 22 are bent back to provide a channel for the spring 4 and to prevent lateral movement of contact members 5.

A second embodiment of the earthing washer 2 is shown in FIGS. 7A to 7D. The main body of the washer is moulded from plastics material. This provides the earlier stated advantages of plastics material for the earthing washer. Side walls 50 are similar to side walls 30 in the first embodiment, but the base 49 has an annular recess 38, the top of the recess abutting the contact members 35. The purpose of the recess 38 is discussed below. Guides 42 are integrally moulded with the washer, and provide the guide function for the contact members 35. They also provide structural strength for the washer, as do ribs 37 which are intermediate between the two sets of guides 42.

The outer surfaces of contact members 35 conform to those of contact members 5 in the first embodiment. The second embodiment differs from the first embodiment in the mounting of the contact members 35. Guides 42 have grooves 51 therethrough, as seen in FIG. 7B. These grooves are parallel to the cable axis and lie substantially on the same annulus as recess 38, projected along the axis of the gland. These grooves are open to the earthing tag end of the earthing washer 2. Contact members 35 have slots 36 which extend laterally, that is, normal to the cable axis. Pins 34 are passed through slots 36; the pins 34 should be a tight fit to the slots 36, but are nonetheless capable of sliding movement along the extent of slots 36. The contact member and pin assembly, seen in FIG. 7D, can be located during manufacture in grooves 51 of guides 42. The contact member is capable of both longitudinal and lateral movement with respect to washer 2, by means of grooves 51 and slots 36 respectively.

The spring action to urge the contact members 35 away from the back wall 49 of the washer is provided by the wall of recess 38. On tightening of the lock nut 16 against the entry component 9, the contact members 35 are urged along the tapered face 50 of the earthing washer as in the first embodiment, the contact members 35 abutting the cylinder 11 to form the earthing connection. The wall of recess 38 acts as a spring and flattens as contact members 35 are pressed against it. In addition to performing the function of spring 4 in the first embodiment, this configuration leads to another advantageous feature. This is that on tightening of lock nut 16 the side walls 50 engage with the flat portion of earthing tag 1, and provide a seal against ingress of dust or moisture. This is an important safety feature which could considerably reduce the danger of explosions in such a cable gland.

In practice, assembly of the gland would be in the following sequence. Firstly, entry component 9, and thus washer 2 and tag 1, are loosely mounted on the wall of the enclosure with lock nut 16. Secondly, the cable is stripped and cylinder 11 and other components between cylinder 11 and gland nut 15 are mounted thereon. The cable can then be passed through entry component 9, and gland nut 15 fully tightened against component 9. Finally, lock nut 16 is fully tightened to bring contact members 5 into contact with cylinder 11 to provide the full earthing connection, and also to mount the cable gland securely to the enclosure wall.

The gland can also be disassembled for inspection by removal of either gland nut 15 or lock nut 16 without the structural strength of the gland being prejudiced thereby. A further advantage is the guarantee of excellent contact within a broad range of gland temperature. This is achieved by the spring pressure on the contact, and is very desirable given the likely temperature rise in the case of the electrical fault.

Figure 1:
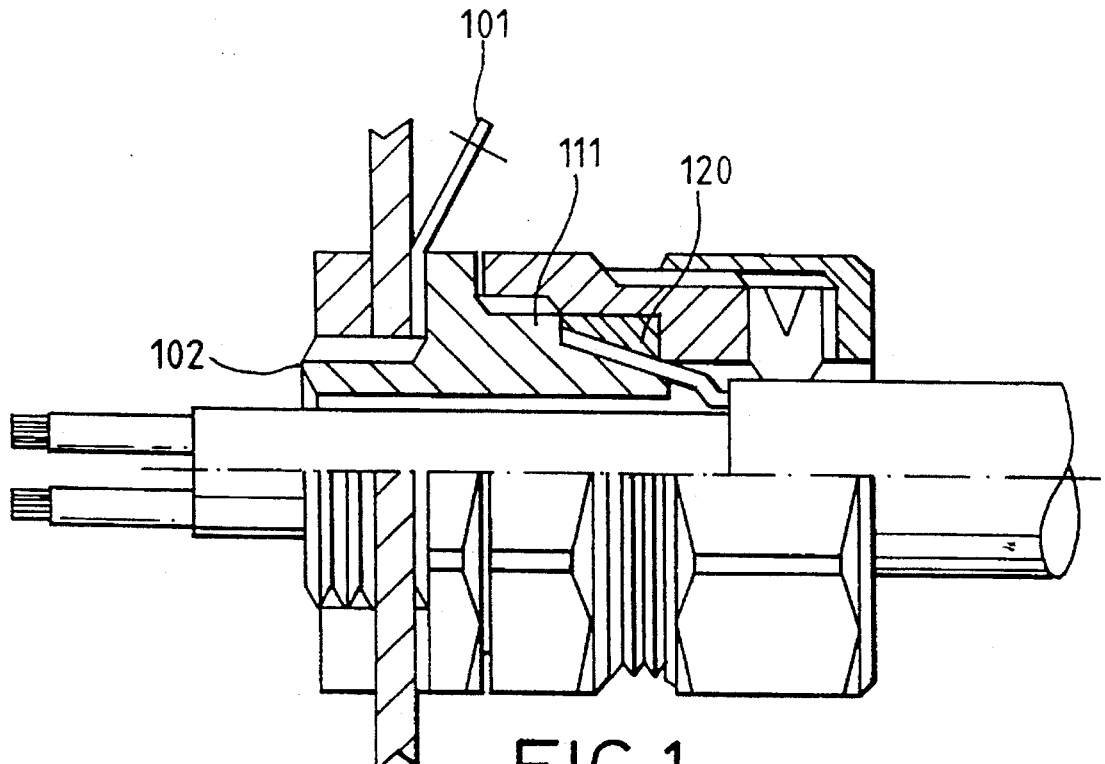
FIG. 1 shows a cross-section of a prior art metallic gland design.
Figure 4:
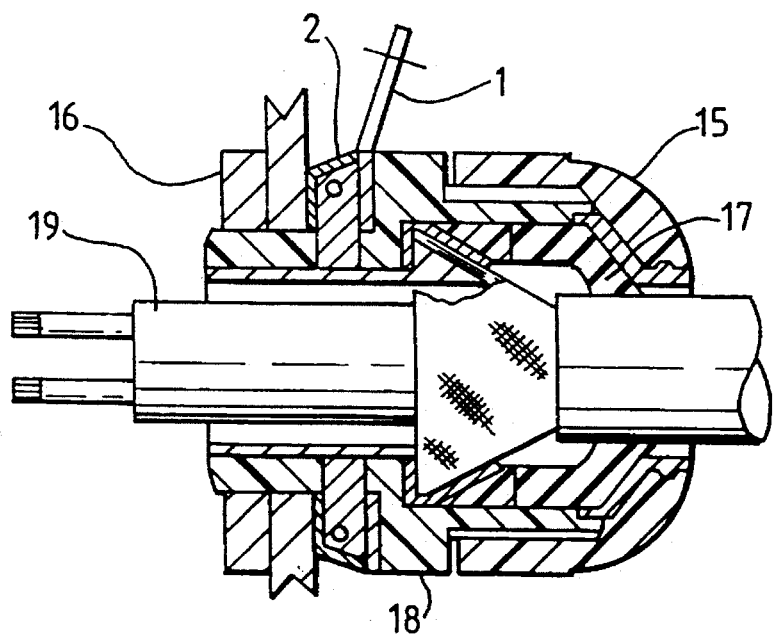
FIG. 4 shows the gland of FIG. 2A when tightened.
Figure 8:
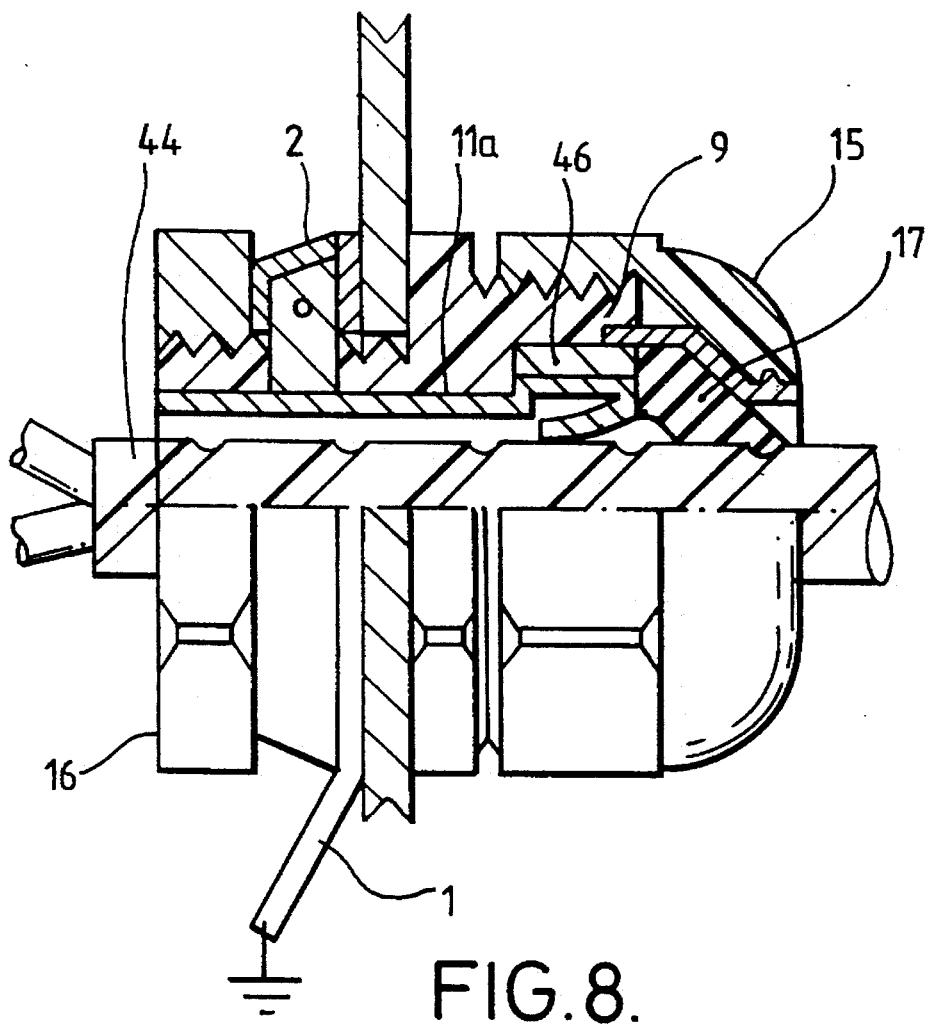
FIG. 8 shows another embodiment of a gland according to the invention.
Figure 9B:
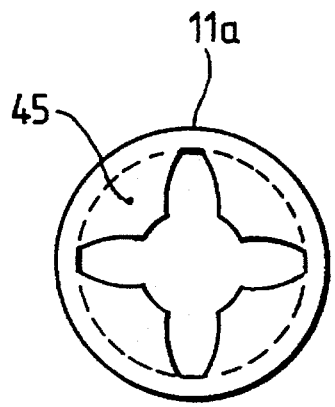
FIGS. 9A and 9B show the electrically conducting connection member of the gland of FIG. 8.
Figure 9A:
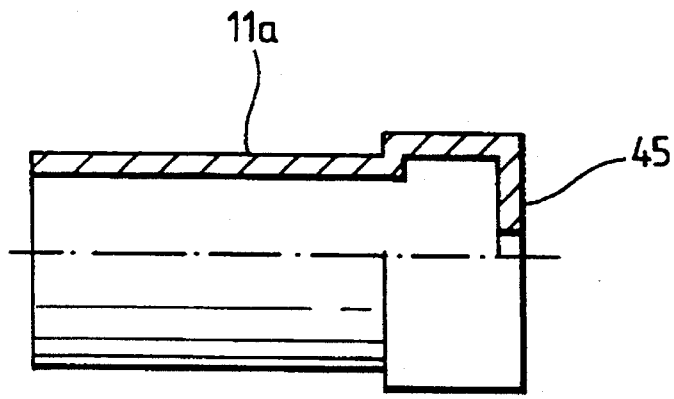

In the embodiment of the earthed cable gland of FIG. 8, which is a view of an assembled gland similar to that of FIG. 4, the significant difference is the design of the connection cylinder 11a. The cylinder 11a is shown more clearly in FIGS. 9A and 9B, FIG. 9A being a longitudinal part-sectional and part-elevational view, and FIG. 9B being an end view.

The cylinder 11a has been designed to accommodate power and instrumentation cables which are common in North America; such cables tend to have, instead of braided armour, an armouring which consists of a sheath of flexible corrugated or grooved aluminium 44. The metal cylinder 11a has an enlarged section at one end and extending inwardly at the mouth of this section are a number of fingers 45. The cylinder 11a is located inside entry component 9 by means of an annular spacer 46.

To make the necessary electrical connection between the cable and the cylinder 11a, the armoured cable is simply inserted into the assembled gland, the fingers 45 flexing inwardly. Good contact is made between the fingers 45 and the armouring 44 of the cable. The fact that the fingers can locate within the enlarged section of the cylinder 11a (see FIG. 8) means that the cylinder can accommodate the largest possible cable diameter.

The connection to earth from the cylinder 11a is made in the same way as in the earlier embodiments.

I claim:

1. An earthed cable gland for an armoured cable for mounting on an enclosure wall comprising:

an electrically innsulating gland nut;

an electrically insulating tubular entry member, threaded at one end for engagement with the gland nut, and with at least one slot extending longitudinally from an other end of the entry member along a part of its length;

means for mounting the entry member on an enclosure wall;

an electrically conducting tubular connection member retained within the entry member and for engagement with an armour covering of a cable extending through said cable gland;

an electrically conducting contact member located within the at least one slot in the entry member, the contact member being moveable inwardly, when said entry member is mounted on the enclosure wall, from a first position wherein said contact member is substantially free of the connection member to a second position wherein said contact member is in abutment and electrical contact with the connection member; and an earth tag for electrical contact with the contact member.

2. An earthed cable gland according to claim 1, wherein the contact member is mounted for sliding contact with an inclined surface of the cable gland.

3. An earthed cable gland according to claim 2, further comprising an annular washer with an inclined wall which forms the inclined surface.

4. An earthed cable gland according to claim 3, wherein the contact member slides along the inclined surface against a spring force.

5. An earthed cable gland according to claim 4, wherein the washer is cup-shaped, with a base having a central aperture for the entry member, and wherein the contact member is retained within the washer, the spring force being provided at the base of the washer.

6. An earthed cable gland according to claim 1, wherein the earth tag has at least one finger for the at least one slot of the entry member, the at least one finger abuts a respective contact member.

7. An earthed cable gland according to claim 1, comprising two slots and two contact members.

8. An earthed cable gland according to claim 7, wherein each contact member is in the form of a plate.

9. An earthed cable gland according to claim 1, wherein the tubular connection member comprises a plurality of inwardly directed, resilient fingers for contacting the armour of the cable.

* * * * *

UNITED STATES PATENT AND TRADEMARK OFFICE
CERTIFICATE OF CORRECTION

PATENT NO. : 5,589,663
DATED : December 31, 1996
INVENTOR(S) : Alan C. D. WALES

It is certified that error appears in the above-indentified patent and that said Letters Patent is hereby corrected as shown below:

Title page, [30], Foreign Application Priority Data, change "9226789" to --9226789.7--.

Signed and Sealed this

Fifteenth Day of April, 1997

Attest:

BRUCE LEHMAN

Attesting Officer     Commissioner of Patents and Trademarks